(12) United States Patent
Brun et al.

(10) Patent No.: US 8,318,628 B2
(45) Date of Patent: Nov. 27, 2012

(54) HYDROTREATMENT CATALYST, METHOD FOR PRODUCTION AND USE THEREOF

(75) Inventors: Claude Brun, Idron (FR); Thierry Cholley, Le Havre (FR); Carole Dupuy, Etterbeek (BE); Georges Fremy, Sauveterre de Bearn (FR); Francis Humblot, Lanneplaa (FR)

(73) Assignees: Total Raffinage Marketing, Puteaux (FR); IFP Energies nouvelles, Rueil Malmaison (FR)

( * ) Notice: Subject to any disclaimer, the term of this patent is extended or adjusted under 35 U.S.C. 154(b) by 707 days.

(21) Appl. No.: 12/519,971

(22) PCT Filed: Dec. 14, 2007

(86) PCT No.: PCT/FR2007/002073
§ 371 (c)(1),
(2), (4) Date: Jun. 18, 2009

(87) PCT Pub. No.: WO2008/090282
PCT Pub. Date: Jul. 31, 2008

(65) Prior Publication Data
US 2010/0044274 A1    Feb. 25, 2010

(30) Foreign Application Priority Data
Dec. 22, 2006   (FR) ...................................... 06 11267

(51) Int. Cl.
*B01J 31/02*    (2006.01)

(52) U.S. Cl. .................... 502/168; 502/150; 208/208 R; 208/243; 208/244

(58) Field of Classification Search .................. 502/150, 502/168
See application file for complete search history.

(56) References Cited

U.S. PATENT DOCUMENTS

| | | | |
|---|---|---|---|
| 5,162,281 A | * | 11/1992 | Kamo et al. .................. 502/168 |
| 2002/0070147 A1 | | 6/2002 | Sonnemans et al. |
| 2006/0054537 A1 | | 3/2006 | Cholley et al. |

FOREIGN PATENT DOCUMENTS

| EP | 0 496 592 A1 | 7/1992 |
|---|---|---|
| EP | 0 506 206 A1 | 9/1992 |
| WO | 2004/067683 A1 | 8/2004 |

OTHER PUBLICATIONS

International Search Report dated Aug. 4, 2008.

* cited by examiner

*Primary Examiner* — Brian McCaig
(74) *Attorney, Agent, or Firm* — Sughrue Mion, PLLC

(57) ABSTRACT

The invention relates to a catalyst for hydroconversion of hydrocarbons, comprising a support made from at least one refractory oxide, at least one group VIII metal and at least one group VIB metal, characterized in further comprising at least one organic compound with at least two thiol functions separated by at least one oxygenated group of formula (I): HS—$C_xH_yO_z$—SH (I), where x=1 to 20, preferably 2 to 9 and for example x=6, y=2 to 60, preferably 4 to 12 and z=1 to 10, preferably 1 to 6. The invention further relates to a method for preparation, a method for activation of said catalyst and use of the catalyst for the hydrotreatment and/or hydrocracking of hydrocarbons.

20 Claims, No Drawings

HYDROTREATMENT CATALYST, METHOD FOR PRODUCTION AND USE THEREOF

The present invention relates to a hydrotreating catalyst, to its method of preparation, to its method of activation and to the use of this catalyst in a process for the hydrotreatment and/or hydrocracking of hydrocarbons, specially hydrocarbons resulting from petroleum fractions having a boiling range of 40 to 560° C.

At the present time, there is a growing demand for desulfurized, denitrogenized and dearomatized hydrocarbon compounds, and manufacturers are developing catalysts of ever greater effectiveness in the purification of hydrocarbons. However, these novel catalysts are much more expensive and available only from a limited number of producers. Furthermore, these catalysts, right from their first regeneration, have an activity often much lower than their initial activity in the fresh state under the same operating conditions. An additional specific reactivation treatment sometimes makes it possible to recover an activity close to the initial activity and thus permits the catalyst to be reused for a new deep hydrodesulfurization cycle and the production of distillates having sulfur contents of less than 10 ppm. There are several reactivation treatments proposed on the market. They generally combine regeneration steps under particular conditions with chemical and heat treatments, and may be associated with ex situ catalyst sulfurization steps.

Today, many "conventional" catalysts based on supports made of one or more refractory oxides and containing a combination of metals of Groups VIB and VIII are used in refining operations, either in the fresh state or regenerated state, either in hydrotreatment or in hydrocracking. If it proves to be impossible for their desulfurization and/or denitrogenation activity to be appreciably increased, these catalysts have to be recovered, stored or destroyed when imposed fuel specifications become so restrictive that it is no longer possible to use them. Such solids storage and/or removal could also be subject to environmental and safety constraints and entail high additional costs for refiners.

The Applicant has therefore sought, firstly, to make known catalysts based on refractory oxide(s) and metals of Groups VIB and VIII more effective and to give them desulfurization and/or denitrogenation activities at least equivalent to those of the best commercially available catalysts and, secondly, to improve the activity of regenerated hydrotreating catalysts so as to increase the number of recycling cycles and to delay the time when they have to be scrapped and destroyed.

Hydrotreating or hydrocracking catalysts, containing metal compounds, in the oxide state or in other forms, must, in order to be active, necessarily be sulfurized before use. This sulfurization may take place either in situ in the hydrotreatment reactor of the refinery or ex situ. The sulfurization may be carried out by means of hydrogen sulfide, mercaptans, organic sulfides, polysulfides and/or elemental sulfur, these compounds being introduced by themselves or mixed with a solvent, or at the same time as the feedstock.

Before this sulfurization step, some of these catalysts are modified beforehand by a treatment with chelating or complexing organic compounds.

The prior sulfurization and modification may take place in situ, i.e. in the hydrotreating/hydroconversion reactor, or else ex situ, i.e. in a dedicated reactor. A prior ex situ modification combined with an in situ sulfurization in the hydrotreating/hydroconversion reactor may also be envisioned.

The range of chelating or complexing organic compounds that can be used is quite large. Thus, it is known to modify these catalysts by means of thioglycolic acids or thioalcohols, thioacetone compounds and thiodiazoles, or else thiocyanates, as proposed in particular by the following applications: EP 289 211, EP 300 629, EP 338 788, EP 357 295, EP 456 592, EP 478 365 and EP 506 206. Other catalysts have been modified by treatment with alcohol/acid organic compounds (EP 482 817), with optionally etherized monoalcohols, dialcohols or polyalcohols (EP 601 722, U.S. Pat. No. 3,954,673, U.S. Pat. No. 4,012,340 and WO 01/76741), urea compounds, polyamines, EDTA, hydrazine and other nitrogen compounds (EP 181 035, EP 335 754, EP 1 043 069, WO 01/76741, U.S. Pat. No. 3,954,673 and U.S. Pat. No. 4,012,340). Catalysts modified with $C_{2-14}$ monoesters have been described in patent applications EP 466 568 and EP 1 046 424.

Patent applications WO 2006/077302 and WO 2006/077326 in the name of the Applicant describe the use of certain molecules designed to increase the activity.

All these compounds are aimed at improving the effectiveness of hydrotreating catalysts, more particularly hydrodesulfurization catalysts. However, these modifications do not always make it possible to increase catalyst performance sufficiently in order to comply with the specifications relating to fuel sulfur contents which are becoming evermore restrictive for refiners. Thus, for example, according to the European Parliament and European Council Guidelines, the countries of the European Community must produce diesel fuel containing less than 10 ppm of sulfur by 2008-2011, whereas the 2005 standard is 50 ppm. Likewise, for all the countries in North America, the sulfur content of diesel must go from 500 ppm to 15 ppm as from 2006. Certain countries, such as Germany, are ahead of the European legislation and have already made it obligatory to sell diesel containing less than 10 ppm sulfur. Similar restrictions already apply to gasoline and other fuels. This change in the specifications imposes restrictions on refinery production, and refiners must comply with these restrictions at the cost of often considerable investment in hydrotreating or hydrocracking units and/or, much more economically, thanks to the improvement in desulfurization performance of current catalysts and the possibility of recycling them several times with their highest level of performance.

For this purpose, the Applicant has designed a novel type of hydrotreating catalyst based on refractory oxides and metals of Groups VIB and VIII of the Periodic Table of the Elements, which has, after sulfurization, a greatly improved desulfurization and denitrogenation activity.

One subject of the present invention is therefore a hydrotreating catalyst comprising a support based on at least one refractory oxide, at least one metal of Group VIII and at least one metal of Group VIB of the Periodic Table of the Elements, characterized in that it further includes at least one organic compound comprising at least two thiol functional groups separated by at least one oxygen-containing group of formula (I):

$$HS-C_xH_yO_z-SH \qquad (I)$$

in which x is an integer from 1 to 20, preferably 2 to 9, y is an integer from 2 to 60, preferably 4 to 12 and z is an integer from 1 to 10, preferably 1 to 6, and in which at least one oxygen-containing group is a ketone or ether functional group, preferably the oxygen-containing group(s) is (are) a ketone or ether functional group.

The support based on at least one refractory oxide is generally of the alumina, silica or silica-alumina type.

The metal of Group VIII of the Periodic Table of the Elements is preferably chosen from nickel and cobalt.

The metal of Group VIB of the Periodic Table of the Elements is preferably molybdenum.

The oxygen-containing group may optionally comprise hydrocarbon side groups possibly containing or carrying one or more heteroatoms chosen from N, S and O.

In a preferred embodiment of the catalyst according to the invention, at least one oxygen-containing group is an ether functional group, preferably the oxygen-containing group(s) is (are) an ether functional group.

Preferably, the compound of formula (I) may be chosen from 2-mercaptoethyl ether and 1,8-dimercaptodioxa-octane (DMDO). More preferably still, the compound of formula (I) is 1,8-dimercaptodioxaoctane (DMDO).

2-Mercaptoethyl ether (CAS number 2150-02-9) has the developed formula:

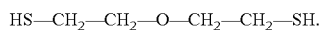

HS—CH$_2$—CH$_2$—O—CH$_2$—CH$_2$—SH.

1,8-Dimercaptodioxaoctane (CAS number 14970-87-7) has the developed formula:

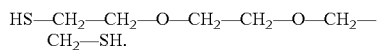

HS—CH$_2$—CH$_2$—O—CH$_2$—CH$_2$—O—CH$_2$—CH$_2$—SH.

Specifically, the Applicant has found that the presence on the catalysts of an organic compound of formula (I) increases the desulfurization and denitrogenation effectiveness of the catalysts, after activation by sulfurization under known conditions. Using these novel catalysts for the hydrotreatment of hydrocarbons, it is possible to lower the desulfurization reaction temperature by about 5 to 25° C., for a given residual sulfur content and moreover under identical operating conditions (pressure, amount of hydrogen and hourly space velocity (HSV)), compared with equivalent catalysts that have not undergone any prior modification. Such an increase in activity makes it conceivable to obtain residual sulfur contents substantially lower than 50 ppm, or even lower than 10 ppm, in the treated hydrocarbons, by varying the operating conditions. If the unit is already capable of producing a petroleum fraction having a low sulfur content, this increase in activity will make it possible to reduce the temperature of the reactor so as to produce the desired sulfur content and thus keep the unit in service for an additional period of time, possibly up to several months.

Preferably, the catalyst comprises 0.1 to 10% by weight of a metal of Group VIII, preferably nickel and/or cobalt, and 1 to 20% by weight of a metal of Group VIB, preferably molybdenum.

The catalyst may be a fresh catalyst, i.e. a nonregenerated one, coming directly from a manufacturer, but the pretreatment according to the invention by one or more compounds of formula (I) is also advantageous when the catalyst is a catalyst regenerated by an appropriate chemical or heat treatment, for example by calcination.

Nevertheless, it is known that certain fresh catalysts, owing to a specific method of preparation, may be more refractory to the recommended treatments or less refractory thereto. Likewise, for the same reasons or following particular operating conditions undergone in the unit, regenerated catalysts may prove to be more refractory to these treatments or less refractory thereto.

The catalyst according to the invention preferably contains at least 0.001 mol of organic compound(s) of formula (I), in particular 0.001 mol to 10 mol, preferably 0.01 to 6 mol and even more preferably 0.1 to 3 mol of compound of formula (I) per mole of metals of Groups VIB and VIII.

The invention also relates to a method for preparing the modified hydrotreating catalyst described above. This method of modification comprises bringing a catalyst, comprising a support based on at least one refractory oxide, at least one compound of a metal of Group VIII and at least one compound of a metal of Group VIB, into contact with at least one organic compound comprising at least two thiol functional groups separated by at least one oxygen-containing group of formula (I):

HS—C$_x$H$_y$O$_z$—SH    (I)

in which x is an integer from 1 to 20, preferably 2 to 9, for example x is equal to 6, y is an integer from 2 to 60, preferably 4 to 12 and z is an integer from 1 to 10, preferably 1 to 6, and in which at least one oxygen-containing group is a ketone or ether functional group, preferably the oxygen-containing group(s) is (are) a ketone or ether functional group.

Preferably, at least one oxygen-containing group is an ether functional group, even more preferably the oxygen-containing group(s) is (are) an ether functional group.

Preferably, this method of preparation applies to the case in which the catalyst comprising a support based on at least one refractory oxide, at least one compound of a metal of Group VIII and at least one compound of a metal of Group VIB is a regenerated catalyst. In this case, the metal compound is generally an oxide.

According to a preferred embodiment of the invention, the step of bringing the catalyst into contact with the compound(s) of formula (I) takes place in the presence of at least one solvent and/or at least one acid.

When the compounds of formula (I) are liquid at the impregnation temperature, the step of bringing them into contact with the catalyst may take place in the absence of solvent. The step of bringing the unmodified catalyst into contact with the organic compound of formula (I) preferably takes place by bringing the catalyst into contact with a solution containing the organic agent. The solution volume may be less than, equal to or greater than the pore volume of the catalyst. The method using a solution volume equal to or less than the pore volume of the catalyst is sometimes referred to as "dry impregnation". When the solution volume is greater than the pore volume of the catalyst, the excess solution will be removed after adsorption of the organic compound of formula (I) on the catalyst.

The organic compound(s) of formula (I) is (are) at least partly soluble in the solvent used. The choice of solvent is particularly important in the implementation of the method. Solvent selection is based on various criteria, such as: its solvent power, for dissolving the compounds of formula (I); its dispersing effect, for dispersing the compounds of formula (I); its wetting effect, for wetting the surface of the catalyst; and its commercial availability under economically acceptable conditions.

Among the solvents that will advantageously be used in the invention, mention may be made of water, supercritical fluids such as carbon dioxide, aromatic, aliphatic and alicyclic solvents, petroleum fractions, monohydroxylated and polyhydroxylated solvents, such as ethanol, tert-butanol, ethylene glycol, diethylene glycol, triethylene glycol, propylene glycol, polyethylene glycol (PEG), glycerol, alkyl esters, such as ethyl acetate, ketones, such as acetone or methyl ethyl ketone, N-methylpyrrolidone, solvents containing an amide functional group, such as dimethylacetamide, solvents containing a nitrile functional group, such as acetonitrile, alkyl carbonates, such as ethyl carbonate, ethers, such as tetrahydrofuran, sulfur-containing solvents, such as dimethyl sulfoxide and sulfolane, acids, such as acetic acid, and halogenated solvents, or a mixture of several of these solvents.

Among these solvents, water, toluene, xylenes, ethylene glycol, diethylene glycol, triethylene glycol, glycerol, ethanol, tert-butanol, polyethylene glycol (PEG), usually with a molecular weight ranging from 200 up to 1000, white spirit and petroleum ether are particularly preferred.

The organic compound(s) of formula (I) may optionally be introduced in the presence of at least one acid, generally one chosen from carboxylic acids, hydrocarboxylic acids and polyacids (such as formic acid, acetic acid, glycolic acid, lactic acid, tartaric acid, maleic acid, citric acid, glyceric acid, gluconic acid, methoxyacetic acid, ethoxyacetic acid, malonic acid, L-(+)-ascorbic acid, salicylic acid, oxalic acid, orthophthalic acid, succinic acid, glyoxylic acid, etc.), thiocarboxylic acids, (such as thiobenzoic acid, mercaptoacetic acid, 1-mercaptopropionic acid, 2-mercaptopropionic acid, 2,3-dimercaptosuccinic acid, mercaptosuccinic acid, thioacetic acid, thioglycolic acid, thiodiglycolic acid, dithiodiglycolic acid, etc.), aminocarboxylic acids (such as nitrilotriacetic acid and EDTA (diammonium ethylenediaminetetraacetic acid)). Among these acids, lactic acid, maleic acid, tartaric acid, citric acid, succinic acid, oxalic acid, thioacetic acid, thioglycolic acid, nitriloacetic acid and EDTA are particularly preferred.

The acid(s) may be introduced with the compound(s) of formula (I) or separately if, for example, the mixture obtained is not homogeneous. In this case, it may be advantageous to use a solvent for simultaneously introducing the acid(s) with the compounds of formula (I), the solvent then dissolving all the organic compounds present. Finally, it is also possible when the acid or acids are introduced separately (before or after, preferably before) from the compound of formula (I) to use a different solvent from that employed for introducing the compound of formula (I).

The step of bringing the catalyst into contact with the compound(s) of formula (I) generally takes place in the presence of hydrogen and at least one sulfurizing agent preferably chosen from hydrogen sulfide, elemental sulfur, $CS_2$, mercaptans, sulfides and/or polysulfides and hydrocarbon fractions having a boiling point below 400° C. and containing sulfur-containing compounds, generally within a hydrotreatment reactor.

The step of bringing the catalyst, optionally predried at 10 to 600° C., preferably 15 to 300° C. and more preferably 20 to 180° C., into contact with a solution of one or more compounds of formula (I) during the impregnation step may last from 1 minute to 7 days, preferably at least 10 minutes to 8 hours, at a temperature of 0° C. to 200° C., preferably at ambient temperature (about 25° C.), and at a low pressure, ranging from atmospheric pressure to 5 bar, preferably at atmospheric pressure. If an acid solution is introduced before the solution of organic compound(s) of formula (I), the operating conditions for impregnation with the acid(s) are similar to those for impregnation with the organic compound(s) of formula (I). In the optional case in which the catalyst is dried, the residual heat of the catalyst may advantageously be used to carry out a hot impregnation.

After the impregnation step, the catalyst may be subjected, possibly after removal of excess impregnation solution, to an optional maturation step at a temperature of 0 to 100° C., preferably from ambient temperature to 80° C., and at atmospheric pressure or up to the pressures generally employed in hydrotreating or hydroconversion processes, the duration of which may be between a few minutes and a few years, in the case in which the catalyst remains stored in drums. Preferably, the maturation step may last from a few minutes to 2 days. A possible optional heat treatment, after the maturation step, may be carried out at temperatures of 50° C. to 250° C., preferably 60° C. to 180° C., for a few minutes to several days, preferably 30 minutes to 3 hours, in an inert atmosphere or not, with or without a gas stream, at atmospheric pressure or up to the pressures generally employed in hydrotreating or hydroconversion processes.

The optional maturation and heat treatment steps may be omitted when the catalyst is fed directly into the hydrotreating or hydroconversion unit.

The catalyst modified by impregnation with the compound(s) of formula (I) is perfectly stable at ambient temperature and in air. The step of bringing the catalyst into contact with the compound(s) of formula (I) may consequently take place ex situ, i.e. outside the hydrotreatment reactor, and this is then a preferred embodiment of the method according to the invention. The ex situ implementation of the method according to the invention may be optionally combined with an ex situ sulfurization of the modified catalyst according to the invention. This enables the refiner to purchase a product immediately ready to use and to reduce as far as possible the loss of time at start-up of the unit.

It is also beneficial to carry out the step of bringing the catalyst into contact with the compound(s) of formula (I) ex situ and to sulfurize the modified catalyst in situ in the hydrotreatment reactor. In this case, the operation of placing the catalyst in the treatment unit is easier since there is no risk of self-combustion of the unsulfurized catalyst, unlike the sulfurized catalyst.

Yet another embodiment consists in carrying out both the modification of the catalyst and the sulfurization in situ.

It should be noted that, even when the modification of the catalyst by the compound(s) of formula (I) takes place in situ in the hydrotreatment reactor, these two operations generally constitute two separate steps carried out one after the other, the step of contacting with the compound of formula (I) preceding the sulfurization step. However, these two steps may also be carried out simultaneously.

Apart from impregnating the organic compounds in the pores of a fresh or regenerated catalyst, it is also possible to introduce said organic compounds during the manufacture/forming of the catalyst. For example, the organic compound(s) of formula (I) may be incorporated into the support even before the Group VIB and VIII metal compounds are deposited. This may be accomplished by mixing one or more organic compounds with the components of the support before the operation of forming the latter, or else by impregnating the formed support with the organic compounds.

Another option consists in introducing the organic compounds and the Group VIB and VIII metal compounds simultaneously, either by mixing them with the components of the support before the forming operation, or by impregnating an already formed support with both the organic compounds and the Group VIB and VIII metal salts. The metal compounds may be metal salts, metal oxides or other forms of compounds. One or other of the operations may be followed by a drying step, carried out under conditions such that at least some of the organic compounds are retained in the catalyst.

It is also possible to incorporate the organic compounds of formula (I) only after salts of the Group VIB and VIII metals. One or other of these steps may optionally be followed by a drying and/or calcination step under conditions such that at least some of the compounds are retained in the catalyst.

The organic compounds of formula (I) may be introduced into the catalyst in liquid form and/or solid particulate form and/or else in the form of a solution or suspension in a suitable solvent.

A further subject of the invention is a method for the in situ or ex situ activation of a hydrotreating catalyst as described above. This activation is carried out by bringing the catalyst into the presence of hydrogen and/or at least one sulfurizing agent preferably chosen from hydrogen sulfide, elemental sulfur, $CS_2$, mercaptans, sulfides and/or polysulfides and hydrocarbon fractions having a boiling point below 400° C. and containing sulfur-containing compounds. A preferred sulfurizing agent is dimethyl disulfide (DMDS).

The sulfurizing agent may be introduced in gaseous form or in the form diluted in a solvent, or as an additive of the feedstock to be hydrotreated.

Finally, a subject of the invention is the use of the catalyst thus activated in situ or ex situ for the hydrotreatment and/or hydrocracking of hydrocarbons, in particular hydrocarbons resulting from petroleum fractions having a boiling point ranging from 40 to 560° C.

The examples given in the remainder of the present description are intended to illustrate the invention without limiting it.

EXAMPLE 1

In this example, one method of preparing a catalyst according to the invention is described.

The starting catalyst (catalyst A) was a commercial catalyst consisting of a combination of 3% cobalt by weight and 10% molybdenum by weight supported on alumina, available on the market and widely used by refiners in hydrodesulfurization units.

This catalyst A was modified by a compound of formula (I) in the following manner: 150 g of catalyst A were placed in the flask of a rotary evaporator rotated at 45 rpm. 49.7 g of DMDO (dimercaptodioxaoctane) were injected over 35 minutes into the core of the catalyst. The impregnated solid was left for 16 hours while being slowly rotated (20 rpm). A catalyst of dry appearance was thus obtained.

After 20 days at ambient temperature, the reactor of a pilot gas-oil desulfurization unit was charged with 100 ml of this catalyst for the purpose of carrying out an activity test as described in Example II below. After charging with the catalyst, the latter underwent a heat treatment at 150° C. for 16 hours in a 20 l/h nitrogen stream. The catalyst thus obtained was called catalyst B.

EXAMPLE II

In this example, the hydrodesulfurization/hydrodenitrogenation activity of catalyst B having undergone a modification according to the invention (Example I) is compared with that of catalyst A that has not undergone any modification treatment.

Each of the catalysts—catalyst A (unmodified) and catalyst B (modified according to the invention)—was sulfurized by a gas-oil to which 2% by weight of DMDS (dimethyl disulfide) had been added according to a procedure recommended by the catalyst manufacturer.

After sulfurization and stabilization of catalysts A and B, a feedstock comprising a mixture of 70% by weight of gas-oil and 30% by weight of a hydrocarbon fraction of the LCO (light cycle oil) type resulting from catalytic cracking was introduced. The characteristics of this feedstock, before hydrotreatment, are given in Table I below.

TABLE I

| Feedstock type | 30% LCO/70% gas-oil mixture |
|---|---|
| Sulfur (ppm) | 9074 |
| Density at 15° C. (g/ml) | 0.8863 |

TABLE I-continued

| Feedstock type | 30% LCO/70% gas-oil mixture |
|---|---|
| Monoaromatics (wt %) | 20.7 |
| Diaromatics (wt %) | 21.3 |
| Triaromatics (wt %) | 3.8 |
| Sum of aromatics (wt %) | 45.8 |
| Nitrogen (ppm) | 389 |
| Distillation temperatures (° C.) according to the ASTM D86 standard: | |
| Initial point | 180 |
| 5 vol % | 224 |
| 50 vol % | 291 |
| 95 vol % | 360 |
| Final point | 361 |

The hydrotreating reaction was carried out at a pressure of $27 \cdot 10^5$ Pa (27 bar) with a hydrogen/hydrocarbon ($H_2$/HC) ratio of 250 Nl/l at an HSV (hourly space velocity) of 1 $h^{-1}$.

To compare the desulfurization activities, the reaction temperature was adjusted to a value corresponding to a 99% level of desulfurization for each catalyst. The lower this temperature for catalyst B according to the invention, compared with the corresponding temperature for reference catalyst A, the higher the desulfurization activity of said catalyst B.

The results obtained are given in Table II in the form of the temperature difference ($\Delta T$) relative to the reference temperature ($T_{HDS}$) of catalyst A. The temperatures correspond to that required for achieving a 99% desulfurization level.

TABLE II

| Catalyst | A | B |
|---|---|---|
| HDS | $T_{HDS}$ | $T_{HDS}$ −4° C. |

This table shows that catalyst B according to the invention reaches a 99% level of desulfurization at a temperature 4° C. below that necessary for catalyst A. Catalyst B therefore has a higher hydrodesulfurization activity than catalyst A.

To compare the denitrogenation activities, the residual nitrogen content for a given reaction temperature $T_{HDN}$ was measured for each catalyst. The lower this residual nitrogen content, the higher the denitrogenation activity of the catalyst.

The results obtained are given in Table III.

TABLE III

| Catalyst | A | B |
|---|---|---|
| Residual N at $T_{HDN}$ (ppm) | 120 | 81 |

It may be seen that catalyst B according to the invention enables the residual nitrogen content of the feedstock to be lowered much more than catalyst A, indicating that it also has a higher denitrogenation activity.

The invention claimed is:

1. A hydrotreating catalyst comprising a support based on at least one refractory oxide, at least one metal of Group VIII and at least one metal of Group VIB of the Periodic Table of the Elements, characterized in that it further includes at least one organic compound comprising at least two thiol functional groups separated by at least one oxygen-containing group of formula (I):

$$HS-C_xH_yO_z-SH \qquad (I)$$

in which x is an integer from 1 to 20, y is an integer from 2 to 60, and z is an integer from 1 to 10, and in which at least one oxygen-containing group is a ketone or ether functional group.

2. The catalyst as claimed in claim 1, characterized in that the oxygen-containing group(s) is (are) a ketone or ether functional group.

3. The catalyst as claimed in claim 1, characterized in that at least one oxygen-containing group is an ether functional group.

4. The catalyst as claimed in one of the preceding claims, characterized in that the organic compound of formula (I) is chosen from 2-mercaptoethyl ether and 1,8-dimercaptodioxaoctane (DMDO).

5. The catalyst as claimed claim 1, characterized in that the organic compound of formula (I) is 1,8-dimercaptodioxaoctane (DMDO).

6. The catalyst as claimed in claim 1, comprising 0.1 to 10% by weight of a metal of Group VIII, and 1 to 20% by weight of a metal of Group VIB.

7. The catalyst as claimed in claim 1, comprising at least 0.001 mol of organic compound(s) of formula (I) per mole of metals of Groups VIB and VIII.

8. A method of preparing a hydrotreating catalyst as claimed in claim 1, which comprises bringing a catalyst, comprising a support based on at least one refractory oxide, at least one compound of a metal of Group VIII and at least one compound of a metal of Group VIB, into contact with at least one organic compound comprising at least two thiol functional groups separated by at least one oxygen-containing group of formula (I):

HS—$C_xH_yO_z$—SH      (I)

in which x is an integer from 1 to 20, y is an integer from 2 to 60, and z is an integer from 1 to 10, and in which at least one oxygen-containing group is a ketone or ether functional group.

9. The method of preparation as claimed in claim 8, characterized in that at least one oxygen-containing group is an ether functional group.

10. The method of preparation as claimed in either of claims 8 or 9, characterized in that the catalyst comprising a support based on at least one refractory oxide, at least one compound of a metal of Group VIII and at least one compound of a metal of Group VIB is a regenerated catalyst.

11. The method of preparation as claimed in claim 8, such that the contacting step is followed by at least one maturation step at a temperature from 0 to 100° C., the duration of which is from a few minutes to a few years, said maturation step being optionally followed by at least one heat treatment step at a temperature of 50 to 250° C. and of a duration of a few minutes to a few days.

12. The method of preparation as claimed in claim 8, characterized in that the step of bringing the catalyst into contact with the compound(s) of formula (I) takes place in the presence of at least one solvent and/or at least one acid.

13. The method of preparation as claimed in claim 12, characterized in that the organic compound(s) of formula (I) is (are) at least partly soluble in the solvent used.

14. The method of preparation as claimed in either of claim 12 or 13, characterized in that the solvent is chosen from water, toluene, xylenes, ethylene glycol, diethylene glycol, triethylene glycol, glycerol, ethanol, tert-butanol, polyethylene glycol (PEG), white spirit and petroleum ether.

15. The method of preparation as claimed in claim 14, characterized in that said polyethylene glycol (PEG) has a molecular weight of from 118 to 1000.

16. The method of preparation as claimed in claim 8, characterized in that the step of bringing the catalyst into contact with the compound(s) of formula (I) takes place ex situ, outside a hydrotreatment reactor.

17. The method of preparation as claimed in claim 8, characterized in that the step of bringing the catalyst into contact with the compound(s) of formula (I) takes place in the presence of hydrogen and at least one sulfurizing agent within a hydrotreatment reactor.

18. The method of preparation as claimed in claim 8, characterized in that the oxygen-containing group(s) is (are) a ketone or ether functional group.

19. A method for the in situ or ex situ activation of a hydrotreating catalyst as claimed in claim 1 or prepared as claimed in claim 8, characterized in that said catalyst is brought into the presence of hydrogen and at least one sulfurizing agent.

20. A method for hydrotreatment and/or hydrocracking of hydrocarbons, comprising contacting said hydrocarbons with a catalyst activated by the method as claimed in claim 19.

* * * * *